Sept. 12, 1944.  F. W. HAACK  2,358,160
MIGRATORY STABILIZER FOR BEE HIVES
Filed Oct. 6, 1943
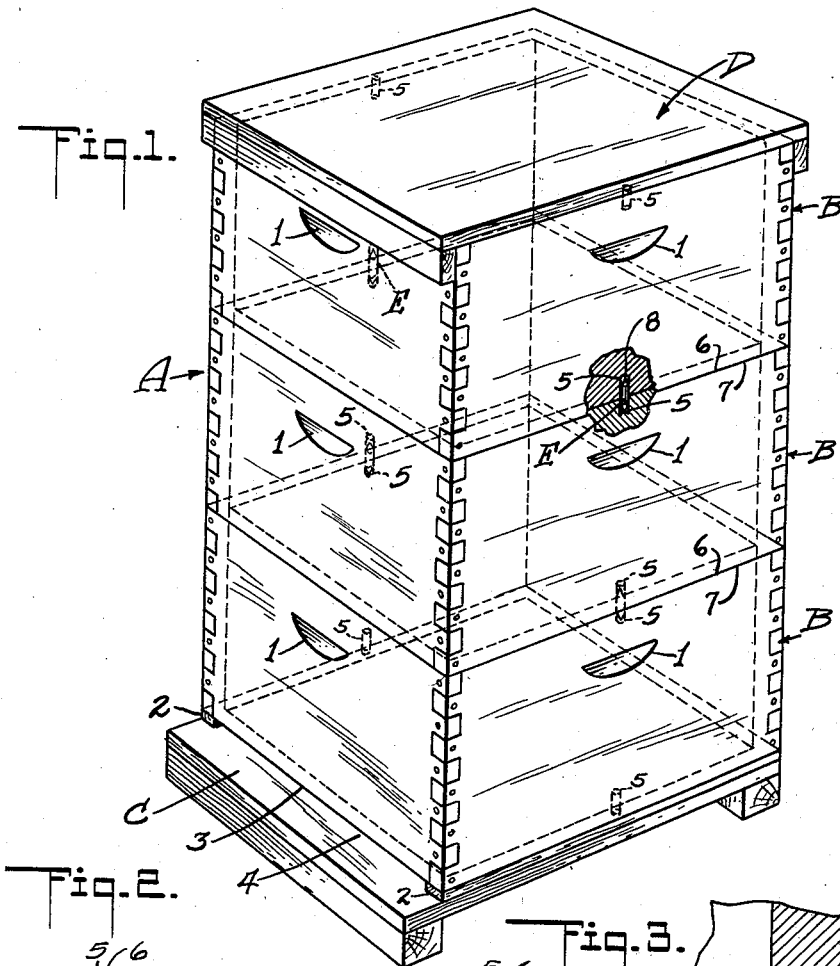
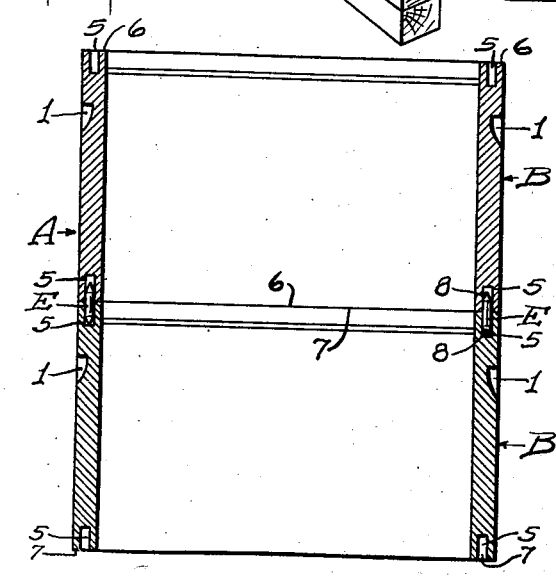
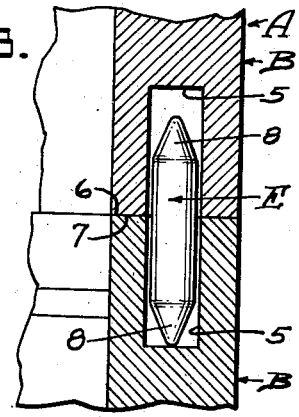
INVENTOR.
FRANK W. HAACK
BY
Munn, Liddy & Glaccum
ATTORNEYS Patented Sept. 12, 1944

2,358,160

UNITED STATES PATENT OFFICE 2,358,160

MIGRATORY STABILIZER FOR BEEHIVES

Frank W. Haack, San Francisco, Calif.

Application October 6, 1943, Serial No. 505,246

2 Claims. (Cl. 6—8)

The present invention relates to improvements in a migratory stabilizer for bee hives, and it consists of the combinations, constructions and arrangements hereinafter described and claimed.

Bee hives are composed of a number of supers which are superimposed one above the other and there is no mechanical connection or any other type of fastening means between adjacent supers. In the case of migratory bee hives, staples are used for temporarily connecting adjacent supers together so that the entire bee hive may be moved as a unit. The pounding of the staples into the bee hive supers, jars the bees and mars the supers.

The principal object of my invention is to provide a simple arrangement for interconnecting adjacent supers together so that one cannot move laterally with respect to another. At the same time the supers are free to be lifted one from the other. Since the supers are connected so that they cannot move laterally with respect to each other, the bee hive is ideally constructed to function as a migratory bee hive.

A further object of my invention is to provide a migratory stabilizer for bee hives which is extremely simple in construction and which is durable and efficient for the purpose intended.

Other objects and advantages will appear in the following specification, and the novel features of the device will be particularly pointed out in the appended claims.

My invention is illustrated in the accompanying drawing forming a part of this application, in whch Figure 1 is a perspective view of a three-unit bee hive showing my migratory stabilizer operatively applied thereto;

Figure 2 is a vertical section through two of the supers showing the stabilizer inter-connecting them; and Figure 3 is an enlarged sectional detail view of a dowel pin received in aligned recesses provided in adjacent supers.

While I have shown only the preferred form of my invention, it should be understood that various changes or modifications may be made within the scope of the appended claims without departing from the spirit and scope of the invention.

In carrying out my invention I provide a bee hive indicated generally at A, this hive has three supers B placed one above the other. The supers are standard construction and have hand grip recesses 1 in their sides. The lowermost super rests on cleats 2 and these cleats in turn are supported by a platform C. The cleats 2 space the lower edge 3 of the lowermost super above the platform so as to provide an entrance slot 4 for the bees to enter the hive and to leave it. A cover D is placed over the top super. The parts thus far described are standard and form no part of my invention except insofar as they cooperate with the parts now to be described.

Each super B has centrally disposed recesses 5 in their top and bottom side edges 6 and 7, respectively. The adjacent recesses align with each other when the supers are placed in proper position one above the other. A dowel pin E is placed in the aligned recesses 5 and is long enough to extend above the recess 5 in the top edge 6 of a super B and to extend an appreciable distance into the adjacent recess 5 in the bottom edge 7 of the next super. This construction is clearly shown in Figure 3. The dowel pin has tapered ends 8 that makes it easier for the pin to enter the recesses. In actual practice I have found that a dowel pin one and three-quarters inches long is sufficient to enter recesses that are one inch deep. The recesses 5 are preferably three-eighths of an inch in diameter and the dowel pins have diameters of less size than the diameters of the recesses. This will cause the dowel pins to be loosely received in the recesses to accommodate any swelling in the wood and yet the supers will be inter-connected so that one cannot move laterally and free itself from the other.

From the foregoing description of the various parts of the device, the operation thereof may be readily understood.

In certain sections of the country it is necessary to move the bee hives from time to time in order that the bees be given a different area from which to gather honey. With my invention the supers are held against lateral movement when the bee hive is transported from one place to another. Time is saved in doing away with the necessity of securing adjacent supers together by staples. The metal for the staples is also saved and the pounding of the staples into the supers is eliminated. With my invention no preliminary fastening of the supers together need be done. The hive is transported as a unit to the place desired and the dowel pins will hold the adjacent supers in proper position. It is possible to remove one super from another even when my dowel pins are used.

Sometimes in hot weather one super will slide off from another and this is obviated when using my dowel pins. My migratory stabilizer does not interfere with the interior of the supers and these may be provided with the usual frames, none being shown in the drawing.

I claim:

1. The combination with a bee hive having two or more supers arranged in tier formation with the lower and upper edges of adjacent supers abutting each other, at least two edges of each super having vertically extending recesses adapted to be aligned with vertically extending recesses in the adjacent super, of dowel pins removably received in the aligned supers for holding adjacent supers against lateral movement with respect to each other, said dowel pins having diameters of less size than the diameters of the recesses so that the dowel pins will be loosely received in the aligned recesses to permit slight warpage of the supers without binding action on the dowel pins, said dowel pins having tapered ends for aiding in feeding the dowel pins into the recesses of a superimposed super as it is lowered down into place on the supporting super.

2. The combination with a plurality of bee hive supers arranged one above another so that their side walls will coincide with each other and top and bottom edges of adjacent supers will abut each other, said supers having aligned recesses in at least two of their sides, of dowel pins removably and loosely received in the aligned recesses for preventing lateral movement of one super with respect to an adjacent super while permitting the vertical removal of one super from the next one below, said dowel pins having tapered ends for guiding the dowel pins into the recesses.

FRANK W. HAACK.